US005194311A

United States Patent [19]

Baymak et al.

[11] Patent Number: 5,194,311

[45] Date of Patent: Mar. 16, 1993

[54] CUSHIONING CORE AND SEAT CONSTRUCTION ESPECIALLY FOR AN AIRCRAFT SEAT

[75] Inventors: Faruk Baymak, Hamburg; Helmut Stueben, Gruenendeich; Uwe Moog, Hamburg, all of Fed. Rep. of Germany

[73] Assignee: Deutsche Airbus GmbH, Hamburg, Fed. Rep. of Germany

[21] Appl. No.: 845,005

[22] Filed: Mar. 3, 1992

Related U.S. Application Data

[63] Continuation of Ser. No. 446,206, Dec. 4, 1989, abandoned, which is a continuation-in-part of Ser. No. 6,556, Feb. 2, 1987, abandoned.

[30] Foreign Application Priority Data

Apr. 9, 1985 [DE] Fed. Rep. of Germany ....... 8510425
Apr. 15, 1985 [DE] Fed. Rep. of Germany ....... 3513414

[51] Int. Cl.[5] .......................... B32B 3/12; B32B 3/26

[52] U.S. Cl. ...................................... 428/116; 428/71; 428/73; 428/76; 428/119

[58] Field of Search ..................... 428/71, 73, 76, 116, 428/118, 119

[56] References Cited

U.S. PATENT DOCUMENTS

| | | | |
|---|---|---|---|
| 2,257,112 | 9/1941 | Forster | 65/4.1 |
| 2,784,132 | 3/1957 | Maisel | 428/360 |
| 3,329,556 | 7/1963 | McFalls et al. | 428/288 |
| 3,447,163 | 6/1969 | Bothwell et al. | 428/116 |
| 3,674,307 | 7/1972 | Dove | 297/284 |
| 3,801,403 | 4/1974 | Lucek | 156/244.13 |
| 4,040,371 | 8/1977 | Cooper et al. | 112/420 |
| 4,687,691 | 8/1987 | Kay | 428/73 |
| 4,736,932 | 4/1988 | Haslim | 248/626 |
| 4,855,182 | 8/1989 | Ondrejas et al. | 428/116 |
| 4,917,747 | 4/1990 | Chin et al. | 428/116 |
| 5,030,501 | 7/1991 | Colvin et al. | 428/71 |

FOREIGN PATENT DOCUMENTS

| | | | |
|---|---|---|---|
| 803065 | 10/1958 | United Kingdom | 428/73 |

*Primary Examiner*—William J. Van Balen
*Attorney, Agent, or Firm*—W. G. Fasse; D. H. Kane, Jr.

[57] ABSTRACT

A seat cushion section with a fiber core is elastically deformable and combined with a plastically deformable shock absorber seat section to form a seat structure, for example for an aircraft passenger seat. The fiber core of the cushion section has fibers therein which are substantially continuous or uninterrupted within the core volume because each fiber has only two ends and extends otherwise uninterrupted throughout the core volume between these two ends so that any pin effect of fiber ends sticking out of the cushion is minimized. The shock absorber seat section includes plastically deformable elements, such as honeycomb cells, for protecting a passenger during a crash.

10 Claims, 9 Drawing Sheets

FIG. 10
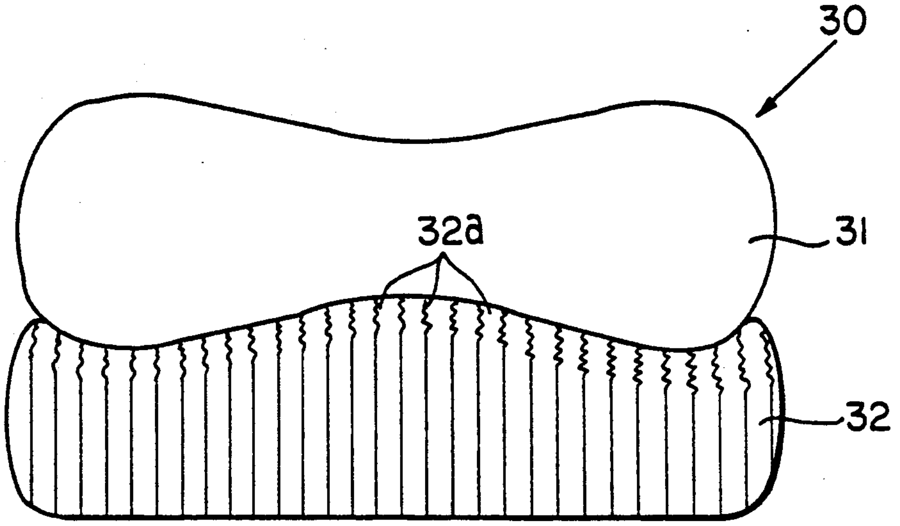
FIG. 11
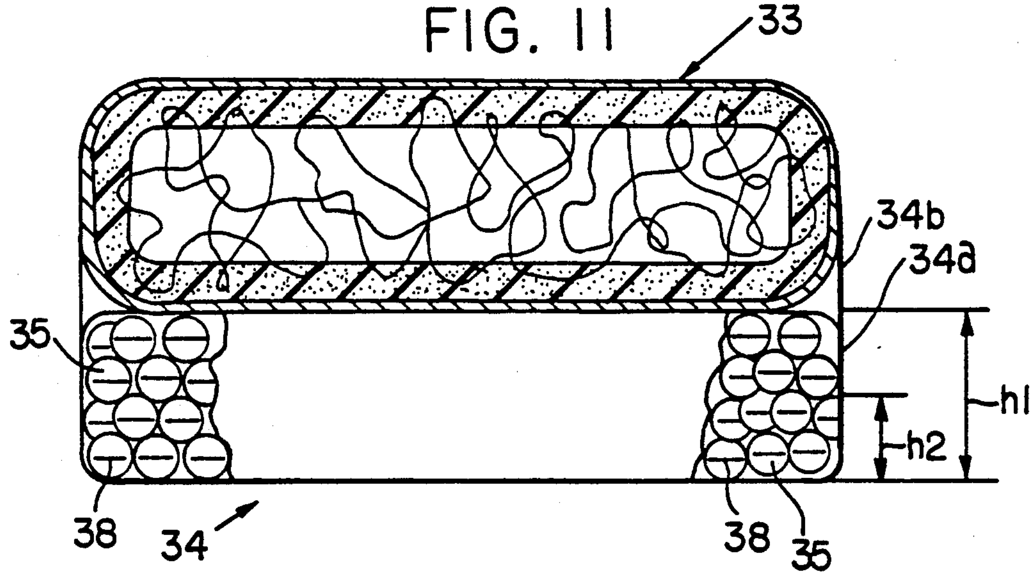
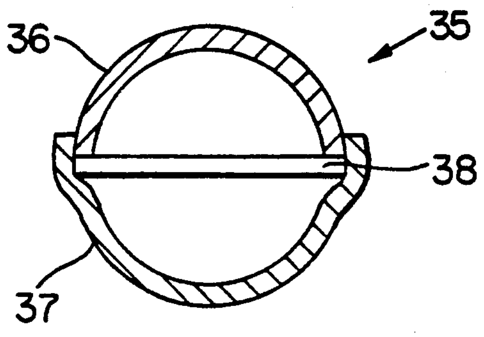
FIG. 12

FIG. 13
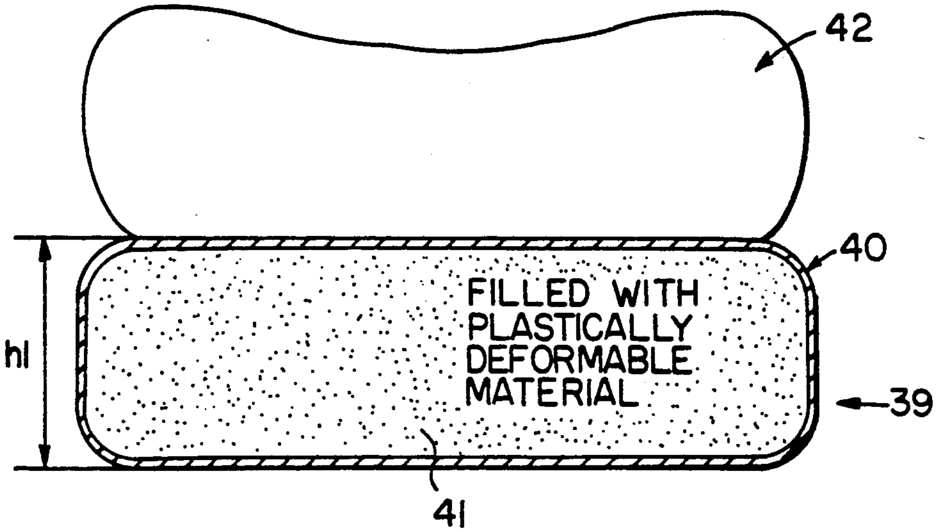
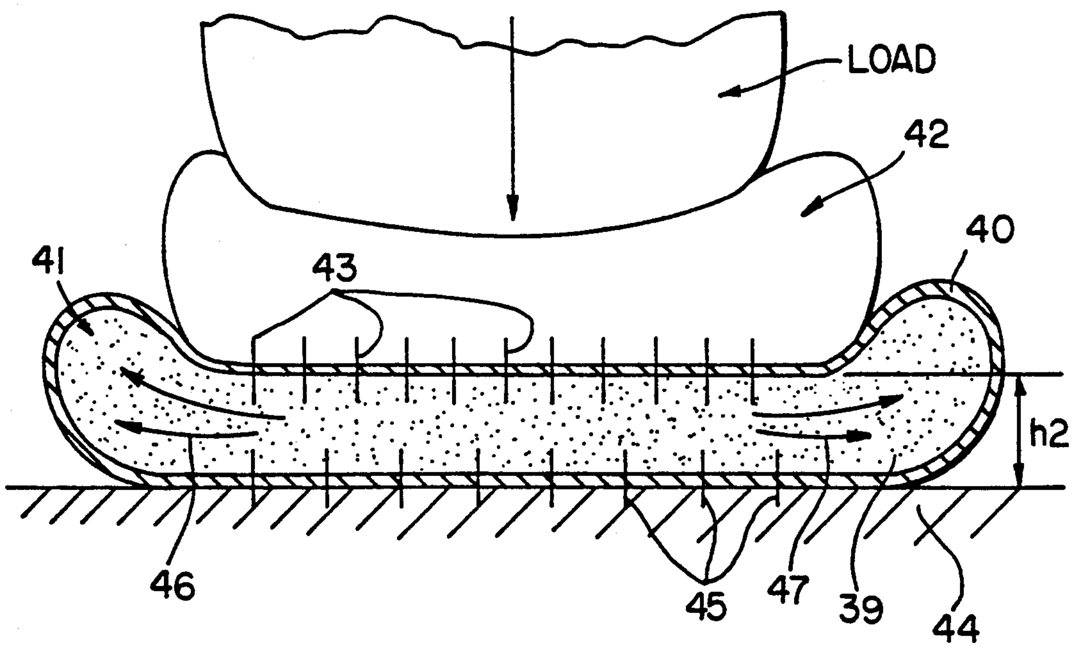
FIG. 14

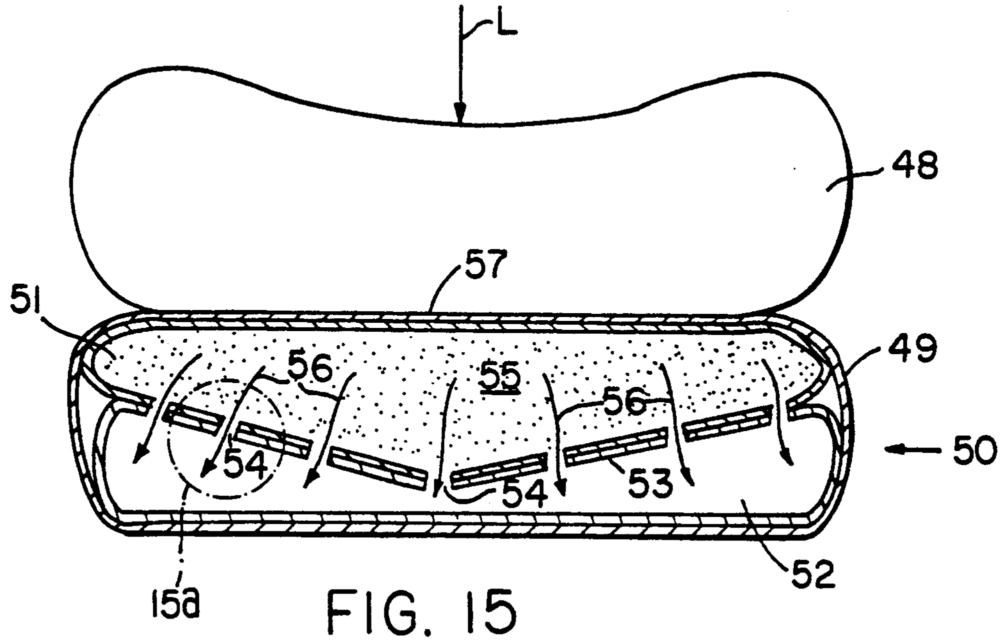
FIG. 15
FIG. 16
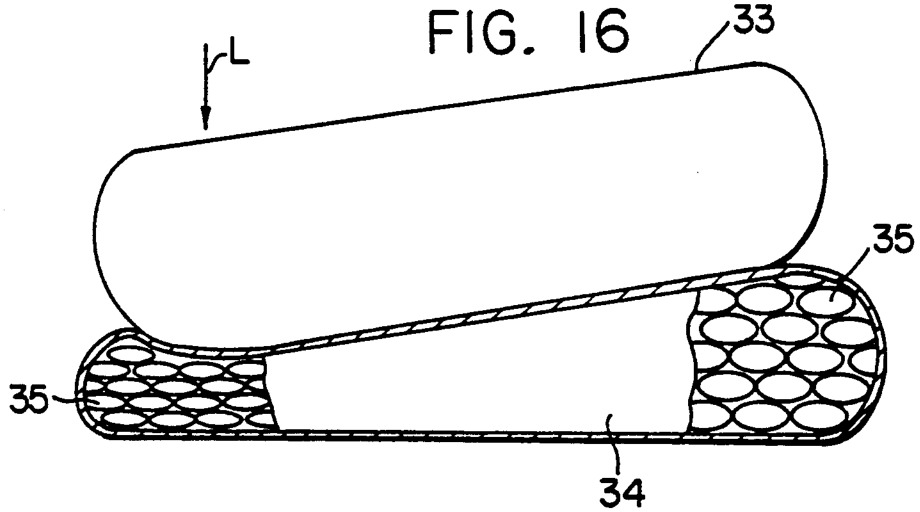
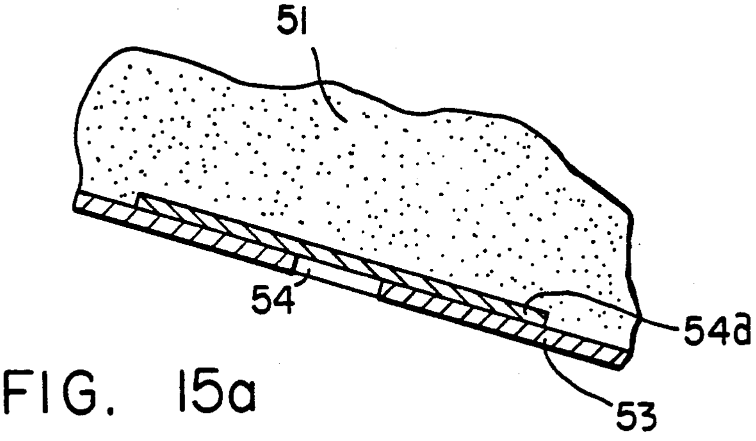
FIG. 15a

CUSHIONING CORE AND SEAT CONSTRUCTION ESPECIALLY FOR AN AIRCRAFT SEAT

CROSS REFERENCE TO RELATED APPLICATION

This application is a continuation of application Ser. No. 07/446,206 filed Dec. 4, 1989 and a CIP of Ser. No. 07/006,556, filed Feb. 2, 1987, both abandoned.

FIELD OF THE INVENTION

The invention relates to a cushioning core and to a seat construction including such a core, especially for an aircraft seat. Methods for manufacturing the core and the seat structure are also disclosed.

DESCRIPTION OF THE PRIOR ART

Cushioning cores of conventional aircraft seats are made, as a rule, of a suitable polyurethane foam material. In order to limit the dangers to passengers and crew of an aircraft in case of fire, as much as possible, it is necessary that all suitable cushioning materials do not generate toxic smoke of toxic gases in case of fire and that they do not contribute to the spreading of the fire. In order to achieve this purpose, conventional cushioning cores have been encased by fire resistant covers. These covers avoid the ignition and substantially diminish the discharge of toxic gases of such cushions in case of fire. However, the complete encasing with fire resistant covers is in many instances technically difficult or impossible, for example, where components such as support tubes and the like pass through the seat, so that cushioning foam material which has been liquified by the influence of heat, can drop down to burn out on the floor. Thus, such fabric type cover materials cannot provide an adequate fire protection in many instances. In case liquified foam material burns, for example, on the floor, toxic gases are generated which additionally are explosive.

It is further known to use flame protection or flame retarding means which are either applied on the cushioning cores or which are introduced into the foam material when the cushioning cores are produced. These flame retarding means are supposed to make the ignition of the materials more difficult. However, these materials have the disadvantage that they evaporate and that they are subject to an aging process so that they remain effective only for a relatively limited time span. Silicon foam is known as a material for producing such cushions. Silicon foam has the required values with regard to its ignitability and smoke gas development. However, silicon foam has a disadvantage in that it is heavy.

U.S. Pat. No. 2,784,132 (Maisel) discloses a fibrous batt wherein the plastic fibers shall have a length within the range of 0.5 to 2.0 inches. Fibers of this length are not suitable for the present purposes, because such fibers can stick out of the surface of the batt and may even stick through a cushion casing filled with such a batt. Further, short fibers do not form a cushion core with an elasticity sufficient for the present purposes.

U.S. Pat. No. 3,329,556 (McFalls et al) discloses a felt type (non-woven) fabric which is not suitable for use as an elastic cushion core for a seat cushion because the fibers are so compacted that they hold together without weaving, whereby any elasticity that the individual fibers may have had initially is no longer available for forming an elastically yielding cushion core.

U.S. Pat. No. 4,040,371 (Cooper et al) teaches how to make polyester staple fibers flame resistant by coating these fibers with cured polysiloxene incorporating small amounts of organic staple fibers.

U.S. Pat. No. 2,257,112 (Forster) discloses the fabrication of glass fiber bodies by blowing hot glass fibers directly into a mold. U.S. Pat. No. 3,801,403 (Lucek) discloses the blowing or extrusion of elastomeric material to form fiber like shapes of any desired length inside an inflatable skin to improve the configuration retaining ability of the skin.

German Patent Publication 3,007,343 (Eisele) discloses a method to simultaneously shape and bond fibers to each other at fiber crossing points or junctions.

OBJECTS OF THE INVENTION

In view of the foregoing it is the aim of the invention to achieve the following objects singly or in combination:

to construct a cushioning core of low weight by using suitable fiber materials, in such a manner that the core has the required characteristics with regard to its ignitability and the smoke gas generation so that special casings for achieving these characteristics are not necessary;

to shape the cushion core of extruded fiber material or of preheated fiber material substantially in one operational step;

to provide a fiber cushion core in which each fiber only has two ends and is uninterrupted or continuous between these two ends, whereby one end is formed at the beginning of a fiber filament emerging from an extrusion nozzle and the other end of which is formed when a fiber filament is cut off at the extruding nozzle;

to combine an elastically yielding seat cushion with a plastically deformable shock absorber in a seat structure, especially an aircraft seat for protecting a passenger in case of a crash;

to precompress or predeform a shock absorber in a seat structure in such a way, that the initial load peaks needed for the plastic deformation of the shock absorber are no longer required to thereby improve the protection for the user of the seat in case of a crash;

to coat the individual fibers and/or the entire elastically deformable seat cushion with flame retardant or fire proof materials for further passenger protection;

to construct seat cushions and shock absorbers for seat structures in such a way that a seat structure is quickly and easily assembled and disassembled, and so that any one of a plurality of seat cushion types can be combined with any one of a plurality of shock absorber types; and to assure an easy replacement of a worn cushion or of a plastically deformed shock absorber without also replacing that section of a seat structure which is still serviceable.

SUMMARY OF THE INVENTION

According to the invention there is provided a cushion core which is made of fire retardant, elastic, longitudinal curved fibers, preferably in an irregular, random fashion, so that a fiber fills the space of said cushion core, said fiber being made of heat resistant synthetic material. A few fibers extend in the core in a substantially uninterrupted, that is in a continuous manner so as to minimize the number of ends, whereby many fiber ends cannot protrude outside the surfaces of the cushion core to act as prickly pins.

According to the invention there is further provided a shock absorber for a seat structure with walls forming a shock absorber chamber having a seat surface and a bottom surface interconnected by side surfaces. A plastically deformable device is enclosed in the shock absorber chamber. The plastically deformable device in the shock absorber chamber may comprise honeycomb cells, or a dough type kneadable material, or hollow bodies, preferably substantially spherical hollow bodies of sheet metal, or any combination of these devices.

According to the invention there is further provided a seat structure comprising an elastically deformable cushion section combined with a plastically or permanently deformable shock absorber section. The cushion section normally supports a passenger in an elastically yielding manner while the shock absorber section takes up impact energy when its shock absorber device or shock absorber elements are plastically deformed by an impact force caused by a crash thus protecting the passenger.

The present cushion cores may be produced by by extruding the fibers directly into a mold, uniformly distributing the fibers in the mold by moving the extrusion nozzles or the mold, and then cooling the fibers, e.g., by cooling the mold. Already formed fibers, e.g. of thermoplastic materials may be used by reheating the fibers, compressing the reheated fibers in a mold, and cooling the compressed fibers to form the desired core shape.

BRIEF DESCRIPTION OF THE DRAWINGS

In order that the invention may be clearly understood, it will now be described, by way of example, with reference to the accompanying drawings, wherein:

FIG. 10 shows a combination seat structure similar to that of FIG. 9, however, with a plastically deformable shock absorber that has been slightly predeformed to eliminate the initial load peak that is required for the plastic deformation of the shock absorber;

FIG. 11 is a combination similar to that of FIGS. 9 and 10, however with a modified shock absorber including plastically deformable spherical elements;

FIG. 12 shows one plastically deformable element of the type used in the shock absorber of FIG. 11;

FIG. 13 is a view similar to FIG. 9, but illustrating a seat with a different elastically deformable shock absorber filled with a kneadable dough type material capable of absorbing energy;

FIG. 14 shows the seat of FIG. 13 under the influence of a load to illustrate its function;

FIG. 15 shows a view similar to FIG. 9, but illustrating a seat with a different elastically deformable shock absorber with two chambers separated by a perforated membrane shown under applied compression;

FIG. 15*a* is an enlarged illustration of the encircled portion 15*a* in FIG. 15;

FIG. 16 shows a seat structure similar to that of FIG. 11 in a condition after a non-uniform deformation of the spherical shock absorber elements;

DETAILED DESCRIPTION OF PREFERRED EXAMPLE EMBODIMENTS AND OF THE BEST MODE OF THE INVENTION

Figure 1:
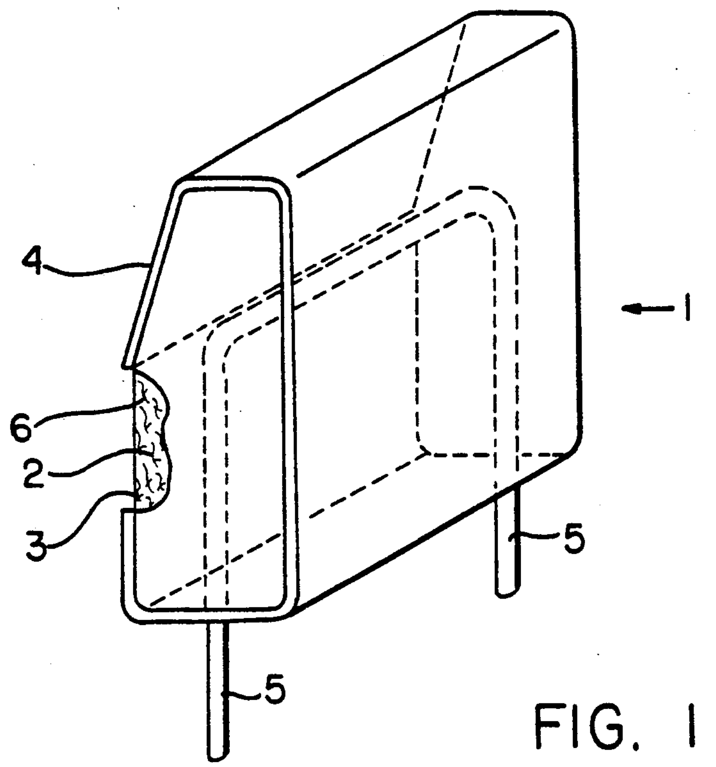
FIG. 1 is a perspective view of a cushion, for example a head cushion, for a seat backrest.

FIG. 1 illustrates a head cushion 1 having a cushion core 2 and a pillow casing 3 enclosed by a fabric cover 4. The cushion 1 is held by a U-shaped support 5 passing through the cushion core 2. The core 2 is made of temperature resistant fibers 6, preferably synthetic fibers. Such cushions can be used not only on aircraft seats, but also in the vehicle manufacturing and furniture industries. The individual fibers 6 are arranged within the cushion 2, preferably along irregularly extending, spacially curved lines so that the fibers are loaded primarily by bending loads when the cushion is used for an improved elasticity. Due to the elasticity of the fibers 6 and due to their random distribution as well as their substantially uninterrupted length within the cushion volume, the cushion 2 will always assume its original shape after removal of a load. The specific density of the synthetic material suitable for the purpose is approximately within the range of 1.1 to 1.5 g/cm$^3$. Thus, it is possible to manufacture cushion cores which have the required mechanical characteristic while having a density of about 60 to 200 kg/m$^3$. Seat cushions are substantially of the same construction as headrests, as will be described in more detail below.

The basic materials for producing the fibers 6 may include, among others, the following materials:

Extrudable Synthetic Materials, such as:

1. Polyether-etherketone (PEEK).

2. Polyetherimide (PEI).
3. Polyamidimide (PAI).
4. Polyethersulfone (PES).

Synthetic Materials Suitable For Prefabricating Fibers:

5. Aramide.
6. Polybenzimidazole (PBI).
7. Polyacrylonitrile (PAN).

Prefabricated fibers which after their extrusion become an "unextrudable" material due to curing can also be used for the present purposes. For example, fibers of thermoplastic materials may be reheated and pressed into a mold to assume the cushion shape determined by the mold cavity.

Figure 2:
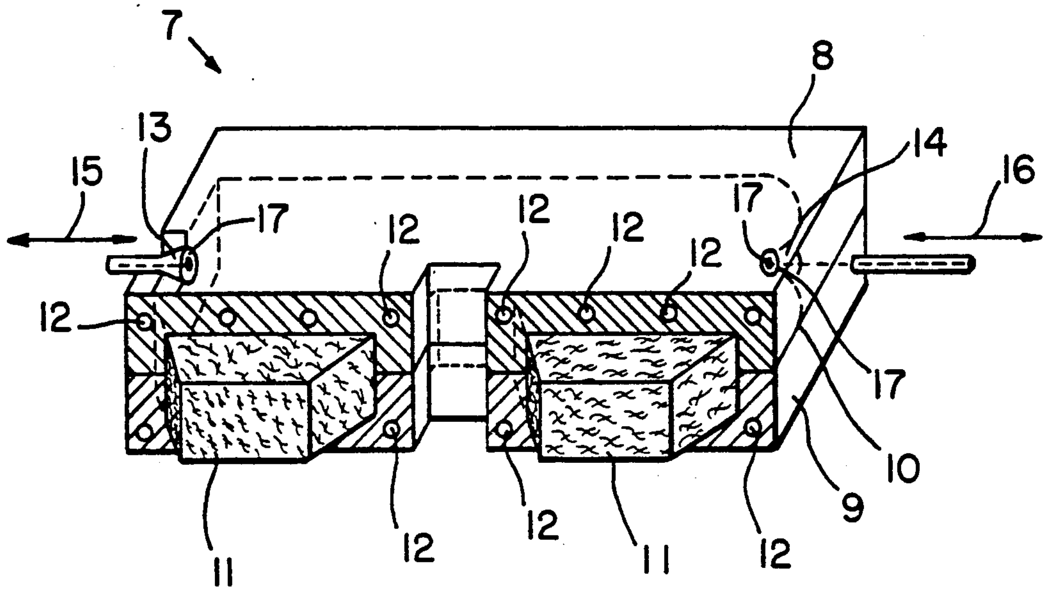
FIG. 2 shows a perspective view of a mold for use in manufacturing cushion cores of the invention.

FIG. 2 shows a mold 7 with an upper mold section 8 and a lower mold section 9 in their closed condition to form, for example, two mold cavities for producing seat cushion cores 11 enclosed by outer surfaces including a bottom surface, a seat surface, and side surfaces interconnecting the bottom and seat surfaces to enclose a given cushion shape defined by the mold cavity. The upper mold half 8 and the lower mold half 9 contact each other along a separation plane 10. The mold 7 is partially shown in section. The hollow space illustrated by dashed lines has the shape of the cushion core 11 to be produced. The mold halves 8, 9 include cooling channels 12 for a cooling fluid. Within the mold 7 there are arranged two nozzles 13 and 14, each of which comprises a plurality of small bores 17. The nozzles are constructed to be displaceable in the direction of the arrows 15 and 16 to produce each fiber with a length that is substantially continuous within the cushion core 11 as will be described in more detail below with reference to FIGS. 3, 4, and 5.

For producing a cushion core 11 a suitable synthetic material is extruded through the bores 17 into the hollow space of the mold 7. Thus, a plurality of plastic synthetic material threads or fibers are entering into the mold 7 in a substantially uninterrupted length within the mold and hence throughout the finished cushion core and along all surfaces of the cushion core. This feature prevents fiber ends from sticking out of the cushion core. The uninterrupted fibers are uniformly distributed throughout the cushion core by a controlled motion of the nozzles 13, 14 in the direction of the arrows 15, 16 within the mold 7. Since the mold is being cooled, the threads solidify to form irregularly or randomly extending, spacially curved fibers 6 which are substantially uninterrupted even at the outer surfaces of the cushion core.

Figure 3:
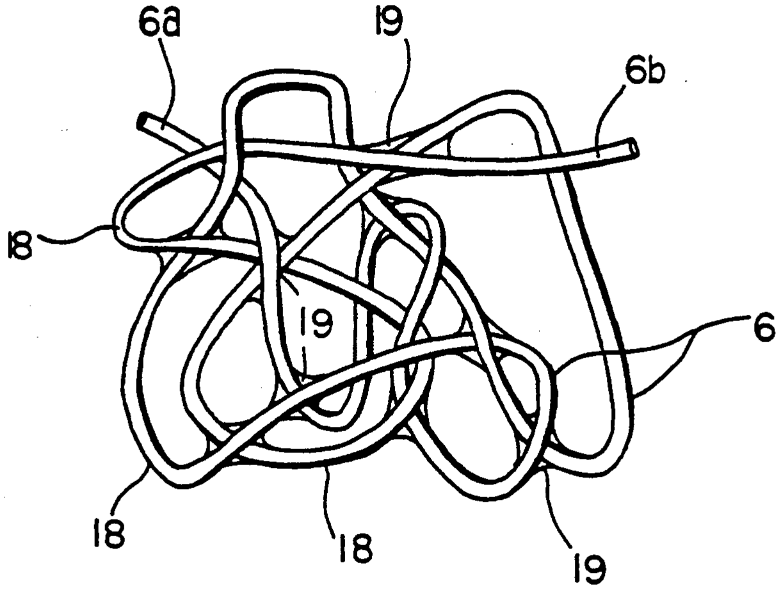
FIG. 3 shows, on an enlarged scale, a continuous fiber which is uninterrupted between its ends for forming the cushion cores of the invention wherein fiber sections at a junction or crossing are bonded to each other by an adhesive.
Figure 4:
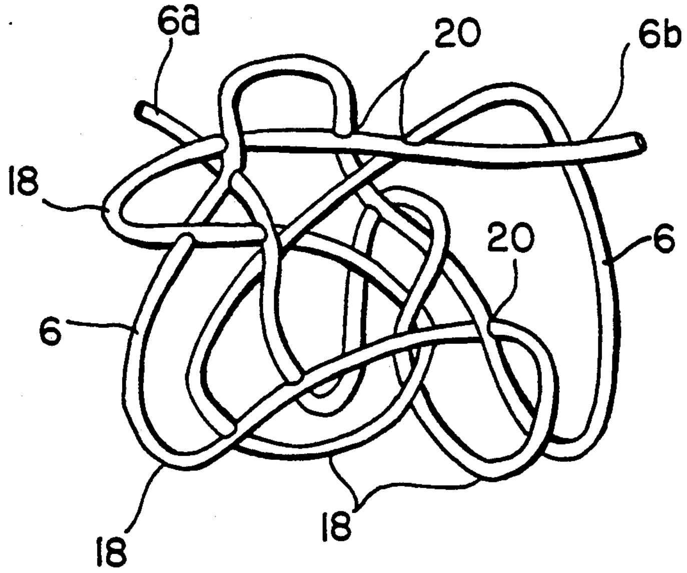
FIG. 4 is a view similar to FIG. 3, but showing welded junctions at fiber crossings.
Figure 5:
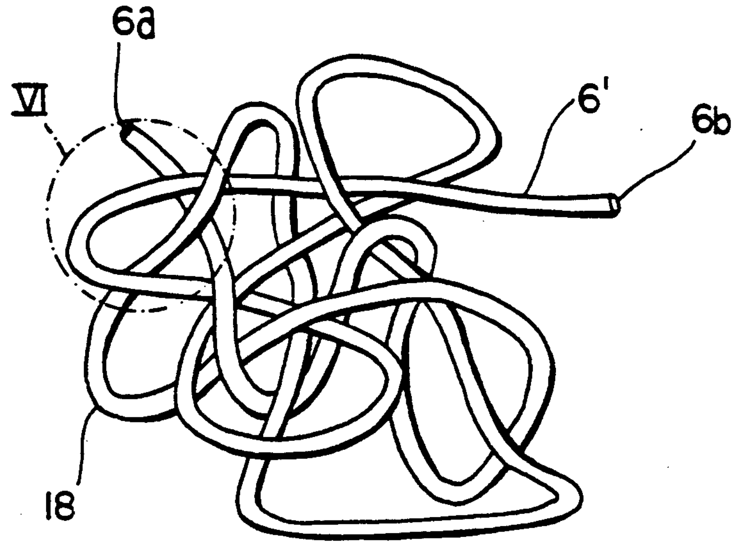
FIG. 5 shows a view similar to FIGS. 3 and 4, but without any connections between fibers where they cross each other.

Referring to FIGS. 3, 4, and 5 these FIGS. show a single fiber 6 having a beginning **6*a* and an end 6*b*. At fiber crossing points adhesively bonded junctions 19 are formed in FIG. 3. Similar junctions 20 are formed in FIG. 4 by heat welding. The welding junctions 20 are achieved automatically when the temperature of the fibers is sufficient for this purpose after the extruding. No separate connections are formed in FIG. 5**.

By varying the diameter of the bores 17 in the nozzles 13, 14 and by varying the proportion of the fiber volume to the mold volume, which proportion depends on the speed of the nozzle motion, it is possible to adjust the required characteristics of the cushion cores, especially the core density and its elasticity. Since the fibers 6 solidify in the mold 7, the outer contour of the fibers, which form the cushion core 11, corresponds to the shape defined by the inner wall surfaces of the mold. Due to the curing of the fibers the cushion core 11 also conforms to the shape of the mold when the cushion core is removed from the mold 7. It is critical that the fibers are substantially uninterrupted or continuous throughout the cushion core and along the side surfaces, along the bottom surface, and along the top or seat surface of the cushion core, because in this way fiber ends cannot stick out of the core surfaces as mentioned above.

Figure 6:
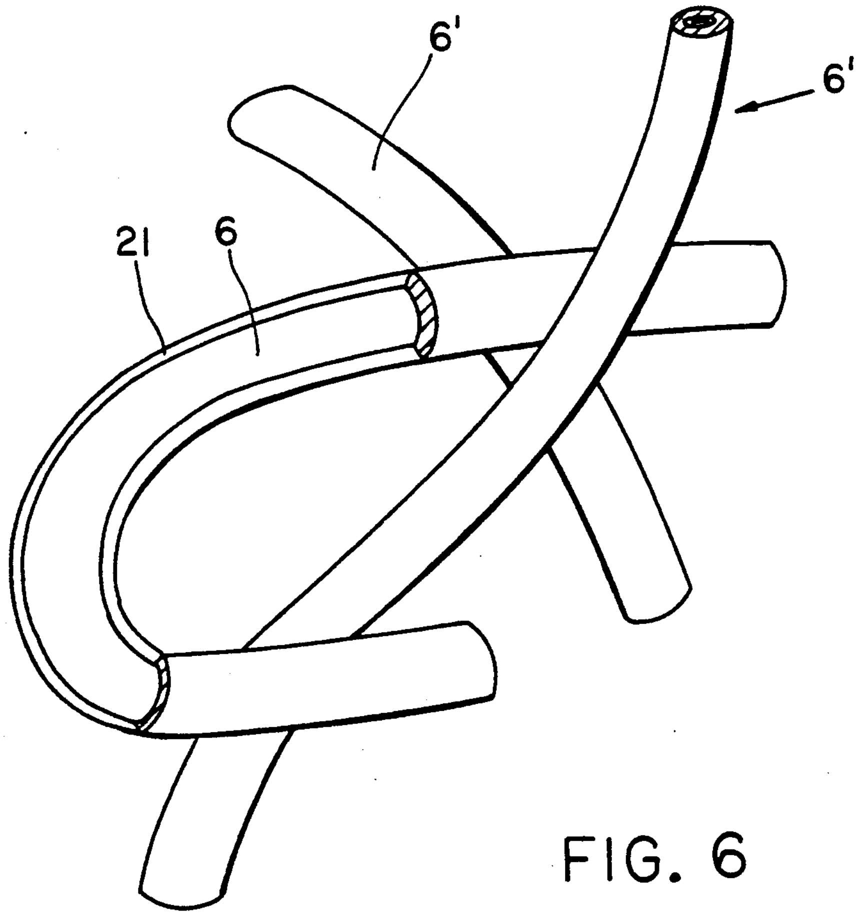
FIG. 6 shows an enlarged view of a portion VI in FIG. 5, to illustrate the fireproof or flame retardant coating on the fibers used herein.

FIG. 6 shows on an enlarged scale the area VI of FIG. 5 to illustrate a fiber 6' which is coated with a cover 21 which envelopes the fiber as a thin skin. The coating or cover 21 may be applied to the fibers 6' individually as they are being extruded. The coating 21 may also be applied by submerging or by spraying the finished cushion core. The interstices between the fiber sections are sufficiently large so that the coating material can penetrate through these interstices to fully coat the fiber surfaces. Depending on the coating material a certain bonding may automatically result at the junctions or crossings. Generally, the coating is a suitable resin, for example, on a polyimide basis. It is possible to use a silicon elastomeric material as the coating material. By this material the heat resistivity of the fibers 6' is further increased. It is further suggested that a fire retardant agent or substance such as fire retardant micro cells, is mixed into the coating material. Polyesters, epoxides, polycarbonates, ABS, polyolefines, polyurethanes, and polyvinyls are suitable as examples of coating materials.

The synthetic material of which the fibers are made may include a substance for increasing the mechanical strength of the fibers. Such substances are, for example, alumina trihydrates, antimony oxides, boron compounds, bromide compounds, and so on.

A modification of the molding operation resides in that the extruding can take place from above into an upwardly open mold which is closed after the extruding. Here also, the nozzles perform controlled motions in order to uniformly distribute the fibers throughout the mold cavity volume.

A further embodiment of the invention resides in that the fibers 6 of the cushion core are made of different materials. In other words, one nozzle makes fibers of one material while the other nozzle extrudes another material. This feature enables controlling the elasticity of the core.

Figure 7:
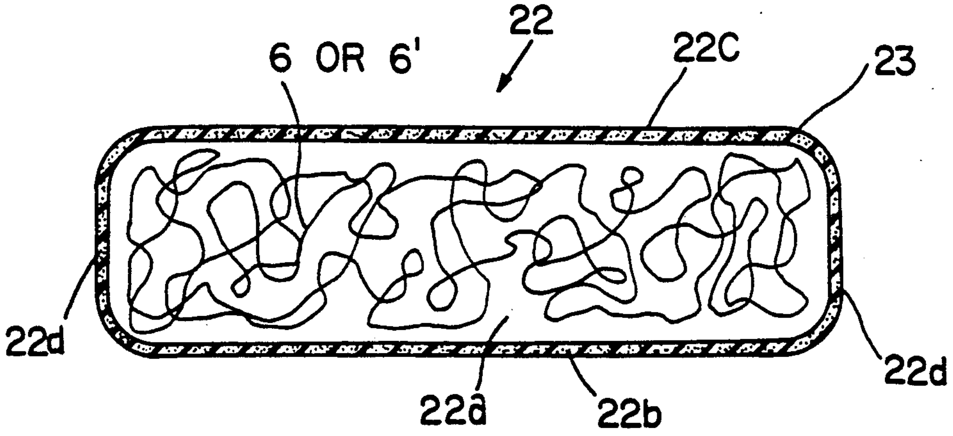
FIG. 7 is a sectional view through a seat cushion of the invention using a fiber fill as disclosed in FIGS. 3, 4, or 5.

FIG. 7 is a sectional view through a seat cushion 22 having a cushion core **22*a* made of fibers 6 or 6' as described above. Fibers 6, 6' extend continuously or uninterruptedly throughout the volume of the cushion core 22*a*. Each fiber has only one beginning and one end within the volume of the cushion core. The core 22*a* is enclosed by a pillow case 23 which is preferably made of glass fiber cloth impregnated with a silicone rubber to make the pillow casing 23 impervious to smoke or fumes. The seat cushion 22 has a bottom surface 22*b*, a seat surface 22*c* and side surfaces 22*d* which interconnect the bottom surface 22*b* with the seat surface 22*c*. The silicone rubber impregnated pillow case 23** provides the seat cushion with smooth outer surfaces.

Figure 8:
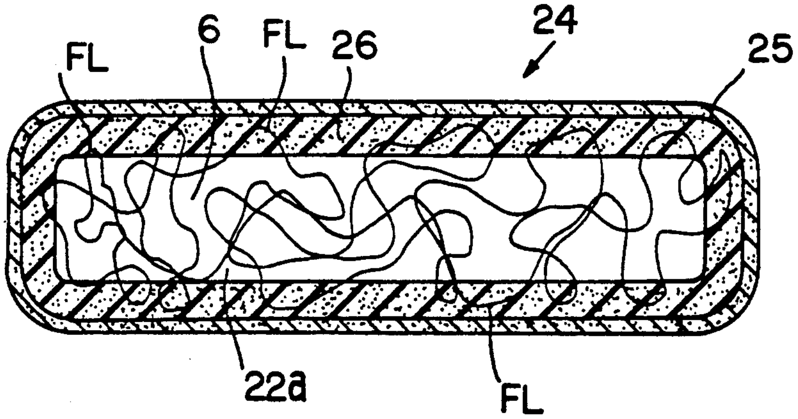
FIG. 8 is a view similar to that of FIG. 7, but illustrating a fiber core enveloped by a foam material casing.

FIG. 8 shows a sectional view similar to that of FIG. 7, however, illustrating a modified seat cushion 24 with a fiber cushion core **22*a* as in FIG. 7. However, in FIG. 8 the core 22*a* is enclosed by an inner casing 26 which in turn is enclosed by an outer pillow case 25. The inner casing 26 is made out of silicone foam material, for example, and the outer pillow case 25** is again made, for example, of glass fiber cloth.

As shown in FIG. 8, fiber loops FL are embedded in the inner casing 26. Such embedding may be accomplished as follows. First, the cushion core 22a is formed as described above. The core is then removed from its mold and the inner surfaces of the mold are covered with a silicone rubber that is not yet cured, but contains a curing agent and has such a viscosity that it will stick to the inner wall surfaces of the mold. The core is then reinserted into the mold with its coated inner surfaces and after closing the mold, the mold is exposed to sufficient heat for the curing of the silicone rubber which thus partially penetrates into the cushion core surface, thereby embedding the fiber loops FL. The so prepared core 22a with its foam rubber casing 26 is then placed into the pillow case 25, for example by sewing. Incidentally, preferably all inner surfaces of the mold sections are coated with the uncured silicone rubber so that the foam material casing 25 encloses the cushion core 22a on all sides.

Figure 9:
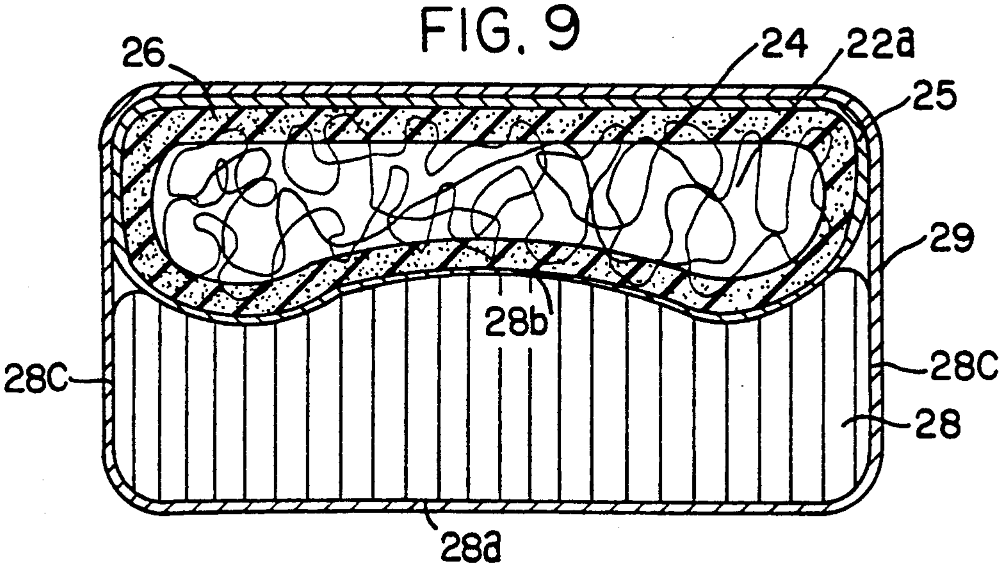
FIG. 9 shows a combination of an elastically deformable cushion core, such as shown for example in FIG. 8 with a plastically deformable honeycomb type shock absorber forming together an aircraft seat structure according to the invention prior to any compression load application.

FIG. 9 combines a seat cushion 24 as shown, for example, in FIG. 8, with a shock absorber 28, for example, in the form of a honeycomb structure to be described in more detail below. The seat cushion 24 includes elastically deformable means in the form of the above described fiber cushion core 22a, the elasticity of which is so adjusted that it can normally support a passenger in an elastically yielding manner. The shock absorber section includes plastically deformable means, for example, in the form of a honeycomb structure as mentioned for absorbing impact energy which permanently deforms the plastically deformable honeycomb cells in response to a crash for protecting a passenger against injury. The shock absorber 28 has a downwardly facing surface or wall 28a, an upwardly facing surface or wall 28b forming a seat surface, and side surfaces or walls 28c connecting the bottom wall 28a to the seat surface 28b which incidentally may be contoured as shown for an improved passenger comfort. The seat surface 28b of the shock absorber 28 supports the bottom surface of the cushion 24. An external pillow case 29 or the like encloses both the shock absorber 28 and the seat cushion 24 to form a structural unit in which the individual honeycomb cells of the shock absorber 28 are normally vertically oriented so that the longitudinal axis of the individual honeycomb cell extends substantially perpendicularly to a seat surface on which a passenger FIG. 10 illustrates an embodiment of a seat structure 30 comprising an elastically deformable seat cushion 31 of the type described above and a plastically deformable shock absorber 32 which may also be constructed of a plurality of honeycomb cells. The difference between FIGS. 9 and 10 resides in the fact that the upper ends 32a of the honeycomb cells of the shock absorber 32 have been partially predeformed prior to the assembly of the cushion 31 with the shock absorber 32. Such predeformation may be performed by a contoured pressing tool for applying a compression to the honeycomb structure in the longitudinal axial direction of the individual honeycomb cells. The purpose of such initial partial deformation is to avoid exposing a passenger sitting on such a seat structure to the power peak that is necessary for initially deforming the honeycomb cells. After the initial deformation the deformation forces are relatively uniform throughout the deformation length. Thus, the predeformation avoids the initial power peak. In other words, a load peak at the beginning of the deformation is not applied to a person sitting on the seat at the time of a crash. Contouring without a predeformation would require a machining operation on the upper seat surface of the shock absorber. FIG. 10 also shows the contouring of the upper surface of the predeformed honeycomb cells.

Another feature of the seat structure of FIG. 10 is the replaceability of each component of the structure individually. In other words, the seat cushion 31 may be replaced by another seat cushion and the shock absorber 32 may also be replaced. Thus, in case of damage to one component only repair costs are reduced. The two sections of the seat structure may, for example, be held together by so-called "Velcro" ® tape or the like. (Velcro ® is a Registered Trademark.)

FIG. 11 shows a seat structure similar to that of FIG. 10, however, the seat cushion 33 is combined with a shock absorber 34 comprising a multitude of individual shock absorber hollow bodies 35 contained in a casing 34a. Preferably, the shock absorber bodies 35 are made as spherical bodies as shown in more detail in FIG. 12. Sheet metal half shells 36 and 37 are first formed, for example, by deep drawing, and then these half shells are assembled by pressing the half shells 36 into a rim portion 38 of the half shells 37 to form these spheres 35. The shock absorber 34 and the cushion 33 may also be held together by Velcro ® tapes 34b or the like.

If the shock absorbing bodies 35 are formed as half shells and then assembled as shown in FIG. 12, it is important and preferable that the junctions 38 in the equatorial plane or ring zone are all oriented horizontally as indicated in FIG. 11. In this type of arrangement of the individual spheres 35, the shock absorption is most efficient so that from an initial heigh h1 prior to an impact, the shock absorber 34 may be reduced to a height h2 about or even less than half its original height. However, the invention is not limited to spheres as shown in FIG. 12.

The sheet metal for making the half shells 36, 37 shown in FIG. 12 is preferably aluminum which incidentially is also suitable for making the honeycomb shock absorbers, for example as shown in FIG. 10.

FIGS. 13 and 14 relate to an embodiment in which a shock absorber 39 has a casing 40 which is made of an elastically deformable material and which is filled with a plastically deformable material such as a kneadable dough type material 41 that has a high viscosity, whereby its deformation will take up energy. The shock absorber 39 is combined with a cushion 42 of the type described above. The cushion 42 and the shock absorber 39 may be connected to each other by Velcro ® strips 43 merely shown as lines in FIG. 14. Similarly, the shock absorber 39 may be connected to a seat surface 44 by Velcro ® strips 45.

FIG. 13 shows the cushion shock absorber combination prior to a deformation in response to a crash load. In this condition the shock absorber 39 has a height h1. After a load has been applied, for example, in a crash as shown in FIG. 14, the shock absorber 39 has an average smaller height h2 because the plastically deformable dough type material 41 has been permanently or plastically deformed by being moved laterally outwardly as indicated by the arrows 46 and 47, thereby increasing the horizontal dimension of the shock absorber while reducing its vertical average dimension. For this purpose it is necessary that the casing 40 is made of an elastically yielding rubber type material to permit the lateral spreading of the plastically deformable material 41.

The plastically deformable material may also be a granular material. However, the shock absorber 39 must have the characteristic of a sand bag, it must be capable of being permanently deformed by an impact. Instead of the Velcro ® strips 43, 45, other connecting elements may be used, such as snap buttons, zippers, or the like so that a permanently deformed shock absorber 39 may be easily replaced while retaining the elastically deformable cushion 42 which is effective during normal use while the shock absorber is effective only during an impact. Incidentally, the elastic casing 40 could also be a plastically deformable envelope provided that it does not impede the plastical deformation of its content.

FIG. 15 shows a cushion 48 of the type described above combined with a shock absorber 50 comprising a casing 49 divided into an upper chamber 51 and a lower chamber 52 by a membrane 53 provided with holes 54. The seat structure is shown at the beginning of the application of a load L. The upper chamber 51 is filled with a kneadable plastically deformable material 55 having a viscosity which keeps the material 55 in the upper chamber 51 under normal load conditions. Further, the viscosity is such that with an excessive load application, the material 55 is squeezed through the holes 54 in the membrane 53 as indicated by the arrows 56. The lower chamber 52 is filled with air that is compressed by the material 55 as it is squeezed through the holes 54. The work or energy necessary for squeezing the material 55 through the holes 54 results in an effective shock absorption. The wall 57 between the cushion 48 and the shock absorber 50 must be strong enough so as not to rupture when the load L is being applied. Such load is the result of accelerations up to 16 gs in an aircraft crash. Speeds up to 11 m/s may be involved. Membrane 53 slants downwardly as shown.

Rather than providing the shock absorber 50 only with two chambers, it may be divided into a plurality of chambers.

FIG. 16 shows the embodiment of FIG. 11 after an off-center load application in which the left side of the seat structure has been exposed to a larger load than the right side. As a result, the shock absorber bodies 35 on the left side have been crushed more than the bodies 35 on the right side.

Figure 17:
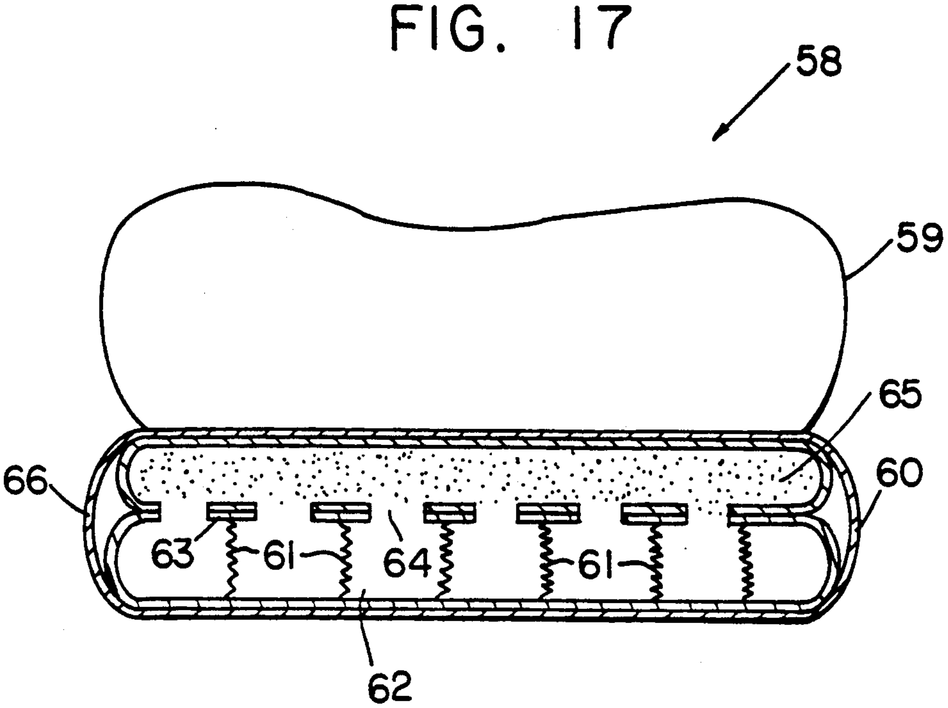
FIG. 17 shows a seat structure similar to that of FIG. 15, but with a modified shock absorber in which a perforated membrane is supported by plastically deformable energy absorbing elements.

FIG. 17 shows a seat structure 58 with a cushion 59 constructed as described above, combined with a shock absorber 60 similar to that of FIG. 15, however modified by shock absorber columns 61 located in the lower chamber 62 below a membrane 63 which divides the shock absorber into a number of chambers, for example, the lower chamber 62, and an upper chamber 65 filled with a highly viscous material as described above. The plastically deformable columns 61 support individual membrane sections and are preferably predeformed as shown to again eliminate initial force peaks. The columns 61 are constructed, for example, as honeycomb sections of thin sheet metal, such as aluminum. The shock absorber 60 is encased by a casing 66 which encloses both chambers 62 and 65.

Figure 18:
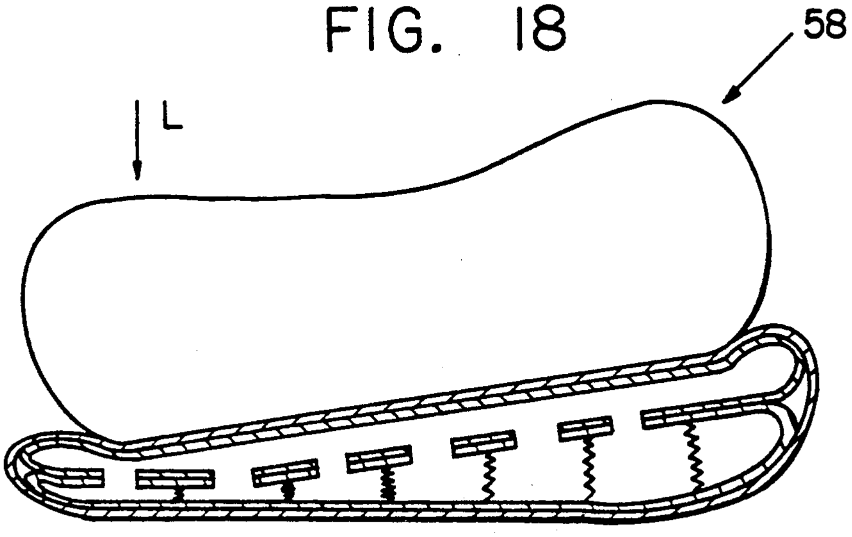
FIG. 18 shows the seat structure of FIG. 17 after a non-uniform load application which has permanently deformed the shock absorber.

FIG. 18 shows the seat structure 58 after an off-center load application deforming the columns mostly on the left side.

Figure 19:
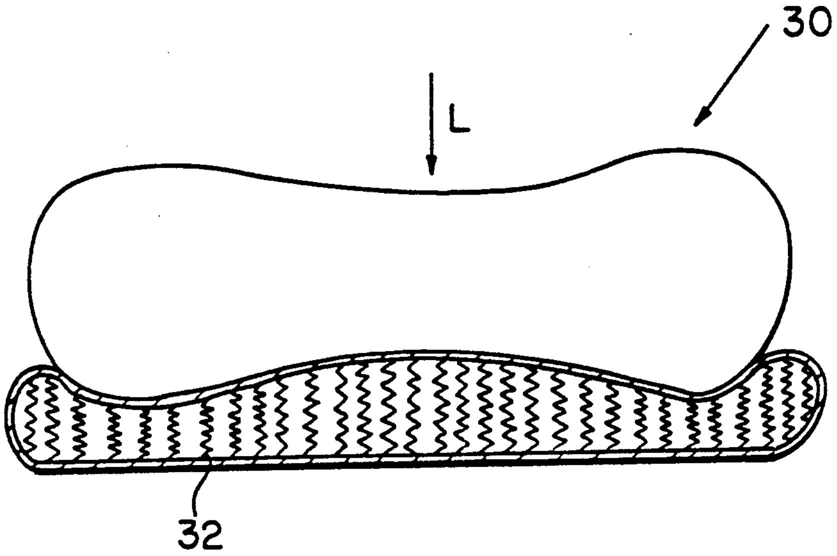
FIG. 19 shows the seat structure of FIG. 10 in a condition after the honeycomb type shock absorber has been permanently deformed by a prior load application substantially uniformly distributed over the seat surface.

FIG. 19 shows the seat structure 30 of FIG. 10 after a centered load application by which the shock absorber 32 has been permanently deformed by a relatively uniform distribution of the impact load.

Figure 20:
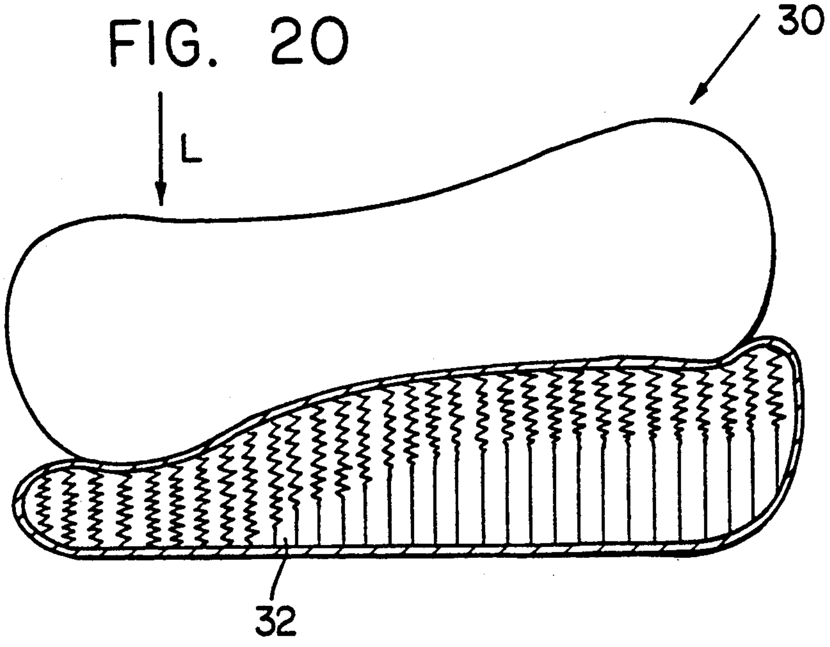
FIG. 20 is a view similar to that of FIG. 19, however, showing a non-symmetrical shock absorber deformation after a non-uniform load application.

FIG. 20 shows the seat structure 30 of FIG. 10 after an off-center load application, whereby the left-hand side of the shock absorber 32 was deformed more severely than the right-hand side.

As plastically deformable materials 41, 55 and 65 according to FIGS. 13, 14, 15, and 17 one can use, for example:

a) a non-cured silicon rubber (without hardener) or
b) a silicone oil or silicone fat. Instead of these materials a brittle material having a porous structure may be used, which breaks progressively under a certain load.
c) a respective material is, for example, gas entrained concrete, such as is known under the Trademark "YTONG".

In FIGS. 15 and 17 the openings 54 and 64 are closed by thin membranes having a determined breaking strength, which open said openings in response to reaching a predetermined load. Thus, it is assured, that under normal conditions the mass 41, 55, 65 is not pressed through the openings. See FIG. 15*a*, showing a portion of FIG. 15, wherein the opening 54 of the membrane 53 is shown covered with a thin membrane 54*a*. These thin membranes 54*a* are also provided in the shock absorbers of FIGS. 17 and 18.

The columns 61 shown in FIGS. 17 and 18 may be walls of large honeycombs, which are predeformed (prebuckled) as indicated by the zig-zag lines.

Although the invention has been described with reference to specific example embodiments it will be appreciated that it is intended to cover all modifications and equivalents within the scope of the appended claims.

What we claim is:

1. A seat structure for a vehicle seat, comprising in combination an elastically deformable cushion forming a seat surface and a plastically deformable shock absorber arranged under and in contact with said plastically deformable cushion, said plastically deformable shock absorber comprising a plurality of plastically deformable sheet metal column means each having a longitudinal axis extending substantially perpendicularly to said seat surface for absorbing an impact force, said plastically deformable column means comprising predeformed portions (32*a*) for avoiding exposing a passenger to power peaks that are required to initially plastically deform said column means, whereby said plastically deformable column means absorb energy by being permanently deformed by a crash impact.

2. The seat structure of claim 1, wherein said sheet metal column means comprise a honeycomb structure with a plurality of honeycomb cells having longitudinal axes extending substantially perpendicularly to said seat surface.

3. The seat structure of claim 2, wherein said honeycomb structure has a contoured surface on which said elastically deformable cushion sits.

4. The seat structure of claim 1, wherein said sheet metal column means comprise a plurality of hollow closed sheet metal bodies, stacked to form columns.

5. The seat structure of claim 4, wherein said hollow closed sheet metal bodies comprise substantially spherical hollow bodies.

6. The seat structure of claim 5, wherein each of said substantially spherical bodies comprises two substantially semispherical half shells held together at a junction in an equatorial ring zone.

7. The seat structure of claim 6, wherein all said junctions (38) are oriented horizontally for an efficient shock absorption.

8. The seat structure of claim 1, wherein said elastically deformable cushion and said plastically deformable shock absorber are releasably secured to each other so that each is replaceable independently of the other.

9. The seat structure of claim 1, wherein said sheet metal is aluminum.

10. The seat structure of claim 1, wherein said shock absorber column means comprise a honeycomb structure with plastically predeformed portions near said seat surface for avoiding initial shock peaks.

* * * * *

UNITED STATES PATENT AND TRADEMARK OFFICE
CERTIFICATE OF CORRECTION

PATENT NO. : 5,194,311

DATED : March 16, 1993

INVENTOR(S) : Faruk Baymak et al.

It is certified that error appears in the above-identified patent and that said Letters Patent is hereby corrected as shown below: Title page:

Related U. S. Application Data [63], please change line 3 to read: -- 006,556, Feb. 2, 1987, abandoned.--

Foreign Application Priority Data [30], please add line 3 as follows: --Apr. 9, 1986 [PCT] PCT/DE86/00152--

Signed and Sealed this

Thirtieth Day of November, 1993

Attest:

Bruce Lehman

BRUCE LEHMAN

Attesting Officer

Commissioner of Patents and Trademarks